United States Patent [19]
Culver

[11] 3,762,069
[45] Oct. 2, 1973

[54] JOINT FOR A HUMAN NECK SIMULATOR
[75] Inventor: Clyde C. Culver, Rochester, Mich.
[73] Assignee: General Motors Corporation, Detroit, Mich.
[22] Filed: Oct. 30, 1972
[21] Appl. No.: 302,025

[52] U.S. Cl. .................................................. 35/17
[51] Int. Cl. ......................................... G09b 23/30
[58] Field of Search ....................................... 35/17

[56] References Cited
UNITED STATES PATENTS
3,557,471  1/1971  Payne et al. ............................ 35/17
3,707,782  1/1973  Alderson ................................ 35/17

Primary Examiner—Harland S. Skogquist
Attorney—W. E. Finken et al.

[57] ABSTRACT

A joint for use in a human neck simulator of the type which includes a number of vertebra simulating members arranged in a stacked relationship in alignment with each other and connected for multidirectional angular movement cushioned by viscoelastic material to provide the simulator with lifelike characteristics when subjected to impact loadings. The joint includes a pivotal connection between the two lower vertebra simulating members of the simulator and the axis of movement of this connection is located forward of the connections between the other members so the simulator will lengthen as it tips forwardly under impact loadings to simulate straightening of the human neck under similar loading conditions. A pair of surfaces on the members connected by the joint move toward each other during this forward tipping movement. A mass of viscoelastic material between these surfaces cushions the joint movement in a lifelike manner, and normally maintains the joint in an angular position that simulates the tilting of a person's head when seated on a seat with a conventional rearwardly tilted seat back.

3 Claims, 4 Drawing Figures

PATENTED OCT 2 1973  3,762,069

JOINT FOR A HUMAN NECK SIMULATOR

BACKGROUND OF THE INVENTION

This invention relates generally to a joint for use in a human neck simulator for studying the response of the human body under impact loadings.

The spinal column includes a number of vertebrae arranged in a generally vertically extending relationship and providing the main structural support for the human torso. The spinal column also provides a spinal cavity for carrying the spinal cord which extends between the head and lower portions of the body to carry nerve impulses controlling body functions. Also, the upper or neck portion of the spinal column, of course, supports the head on the torso. The adjacent vertebrae of the spinal column are connected by joints which function generally like ball and socket type joints to allow multidirectional angular movement of the vertebrae relative to each other and to thus provide the generally versatile movement of the human torso.

Since the spinal column plays such an important role in the human anatomy, simulators have been constructed in the past to simulate the spinal column movement on dummies used in impact testing. This impact testing may be performed to study the response of the human body under any of numerous impact situations. One area of present concern is the response of a seated occupant riding in a vehicle subjected to impact conditions.

My prior U.S. Pat. application Ser. No. 239,489, filed Mar. 30, 1972 and assigned to the assignee of the present invention, discloses a spinal column simulator in which the angular movement of the simulator joints is cushioned by a viscoelastic material to provide the simulator with lifelike movement when subjected to impact conditions. The viscoelastic material provides this result because it is rate sensitive and provides a greater resisting force to the angular joint movement as the severity of the impact increases. Also, as the viscoelastic material deforms during the joint deflection resulting from an impact loading, it absorbs a quantity of energy which is dissipated within the material due to internal losses so that only a portion of this energy is returned to the joints while the material moves the joints back to their original positions. These characteristics provide this previously disclosed simulator with lifelike characteristics in protraying the movement of the human spinal column under impact conditions.

The neck portion of the human spinal column has a somewhat J-shaped configuration in that it extends both forwardly and upwardly adjacent its lower end and generally upwardly at its intermediate and higher portions. Consequently, when a vehicle occupant is subjected to an impact so that the head moves forwardly, the neck tends to straighten toward a rectilinear configuration and to thus increase the effective length between the vertebrae at the opposite ends of the neck. Also, since the seat backs of vehicle seats are supported in a rearwardly inclined configuration at an angle anywhere between 5° and 30° from the vertical, the neck will normally be tilted slightly forward from its normal position in order to afford an occupant horizontal vision through the forward portion of the vehicle.

My previously mentioned spinal column simulator includes split ball and socket type joints which do not simulate the neck lengthening resulting from the forward head tipping and neck straightening that occurs during impact conditions. Also, in order to provide the simulator with a forwardly tipped configuration to simulate the neck tilt resulting from the inclined configuration of the seat back, it is necessary to utilize a forwardly pointing wedge shaped support between the lower portion of the simulator and the dummy torso on which it is supported.

SUMMARY OF THE INVENTION

One feature of this invention is that it provides a joint for use in a human neck simulator of the type wherein viscoelastic material cushions the angular movement between connected vertebra simulating members, and this joint includes a pivotal connection between a pair of adjacent vertebra simulating members such that the axis of pivotal movement is located forward of the connections between the other vertebra simulating members to provide an increase in the simulator length as these members pivot against the bias of a viscoelastic mass and allow the simulator to tip forwardly under the impact of impact loadings. Another feature of the invention is that this joint is located at a lower portion of the simulator and the viscoelastic mass normally maintains the two pivotally interconnected vertebra simulating members in a rotational position defining a predetermined included angle such that the simulator is tilted forwardly in an orientation simulating the tilted neck of a seated human. Another feature of the invention is that the viscoelastic mass is positioned rearwardly of the pivotal interconnection between the two pivotally interconnected vertebra simulating members and is supported by a downwardly depending cradle portion on the upper one of these members, and the mass engages the lower side of a lever whose forward end is pivoted to the joint at the axis of pivotal interconnection between the two members and whose rearward end is held against pivotal movement by an upwardly extending portion on the bottom one of these members.

BRIEF DESCRIPTION OF THE DRAWINGS

The above specified features and other features of this invention are readily apparent from the following description of the preferred embodiment and the drawings in which.

DESCRIPTION OF THE PREFERRED EMBODIMENT

Figure 1:
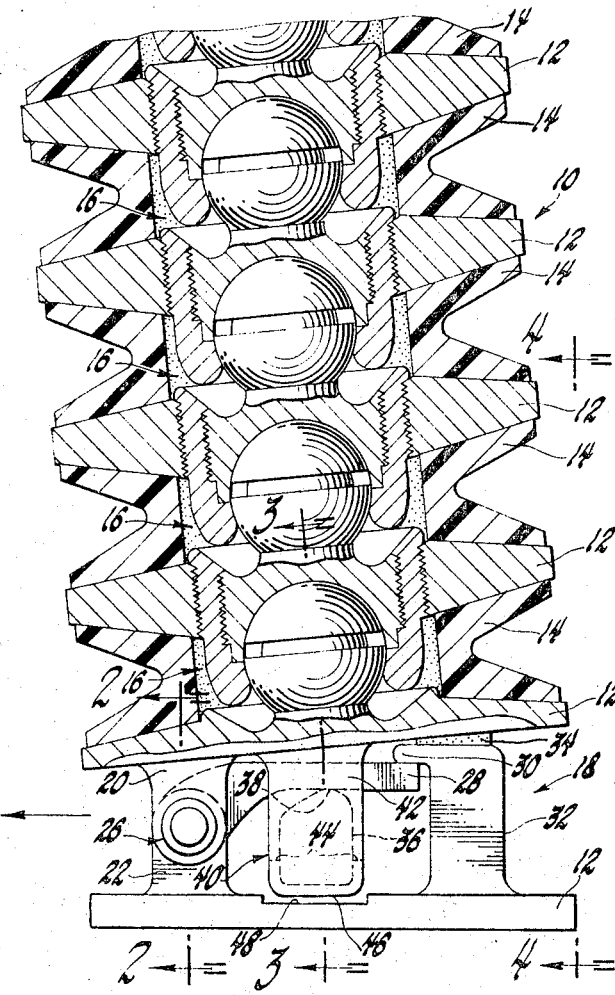
FIG. 1 is a vertical sectional view taken sideways generally through the central portion of a human neck simulator which includes a joint at its lower end that is constructed according to this invention.

Referring to FIG. 1 of the drawings, a simulator is generally indicated by 10 and functions in a manner to simulate the movement of the human neck portion of the spinal column when subjected to impact conditions while riding in a vehicle. The simulator includes a number of vertebra simulating members which have annular configurations and are generally indicated by 12. All but the two lower vertebra simulating members 12 are separated by annular viscoelastic elements 14 and are connected by split ball and socket type connections indicated generally by 16. These joints are similar to the joints disclosed and described in my previously mentioned application Ser. No. 239,489 and, as such, will not be herein described in detail except to say that they connect the adjacent members 12 for multidirectional angular movement in a manner similar to the connections between the vertebrae of the human neck. Also, the viscoelastic elements 14 absorb enerby as these members move angularly relative to each other from their FIG. 1 position during impact loadings, and the viscoelastic elements expend only a portion of this absorbed energy in returning these mambers to their original positions. This characteristic gives the simulator a lifelike response and is described in detail in my previously mentioned application.

Figure 2:
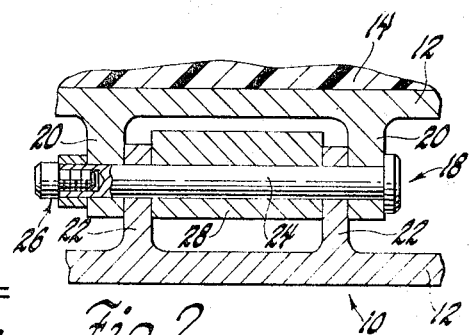
FIG. 2 is an enlarged sectional view taken generally along line 2—2 of FIG. 1 and shows the pivotal connection between the two vertebra simulating members of this joint.

The lower two vertebra simulating members 12 of simulator 10 are interconnected by a joint constructed according to this invention and indicated generally by 18. The forward ends of the two members connected by joint 18 include downwardly and upwardly extending integral legs 20 and 22, see FIG. 2 also, which are interconnected by a headed pin 24. A set screw and bushing arrangement 26 at the unheaded end of the pin maintains it in position so that these two vertebra simulating members are pivotable about an axis extending transversely of the simulator and forward of the connections between the other vertebra simulating members. A lever indicated generally by 28 has an apertured forward end received between the upwardly extending legs 22 on the bottom member 12 of joint 18. The pin 24 is received within the aperture of this forward lever end to thus support this lever end. Lever 28 extends rearwardly from pin 24 and, as seen in FIG. 1, has its rearward end received below a forwardly extending detent flange 30 on a raised integral embossment 32 which extends upwardly from the bottom member 12 of the joint. The upper side of the embossment 32 supports a wedge shaped mass of viscoelastic material 34 which prevents downward pivoting of the top member 12 of the joint about pin 24 in a clockwise direction as viewed in FIG. 1.

Figure 3:
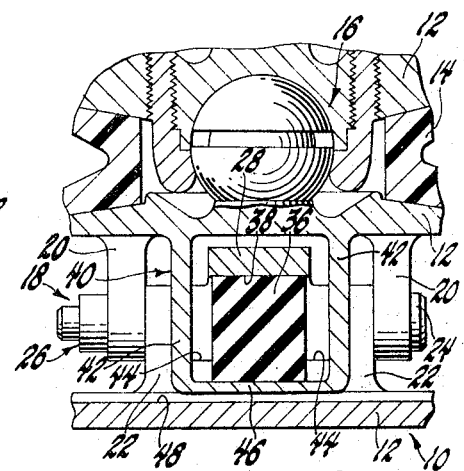
FIG. 3 is a sectional view taken generally along line 3—3 of FIG. 1 and shows the manner in which a viscoelastic material extends between opposed faces on the pivotally interconnected members of this joint so as to maintain them in the angular position relative to each other shown in FIG. 1.
Figure 4:
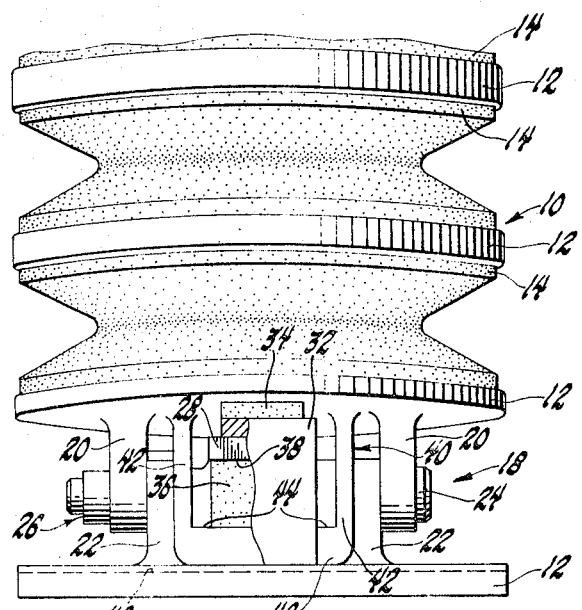
FIG. 4 is a view of the neck simulator and joint taken from the rear along line 4—4 of FIG. 1.

As seen in FIGS. 1 and 3, a mass of viscoelastic material 36 is located below the central portion of lever 28 and engages its lower surface 38 to normally bias the lever upwardly so that the rearward lever end engages detent flange 30 generally as shown in FIG. 1. The viscoelastic mass 36 is supported by a downwardly depending cradle portion 40 of the top member 12 of joint 18. This cradle portion includes side walls 42, and front and rear lower half wall portions 44 for restraining forward and rearward movement of the lower side of viscoelastic mass 36. The bottom wall 46 of cradle portion 40 is located just above a groove 48 in the bottom member 12 of the joint so as to eliminate any contact between cradle portion 40 and this bottom member when the simulator is subjected to a force tending to pivot the top member of the joint downwardly about pin 24 or clockwise as in FIG. 1. Thus, the wedge shaped viscoelastic mass 34 cushions the top member 12 of the joint as it tends to pivot in this direction.

The neck simulator 10 is mounted on a dummy used in vehicle impact studies with the bottom member 12 of joint 18 mounted on the upper torso of the dummy between the shoulders. The viscoelastic masses 34 and 36 maintain the members 12 of joint 18 in a rotational position relative to each other so that they normally define an included angle generally equal to about 15°. Since a seated occupant's neck must tilt forwardly to provide horizontal vision as a result of the rearward tilt of the seat back of the seat, the angle defined between the vertebra simulating members of joint 18 gives the simulator 10 this forwardly tilted orientation. The angle that these two viscoelastic masses cause these two members 12 to define may be varied between 5° and 30° to provide the simulator 10 with a configuration similar to the extreme configurations that a human neck may be subjected to while seated on most vehicle seats.

When the vehicle carrying this dummy is subjected to an impact, the inertia forces supplied to simulator 10 by the dummy head supported on the upper end of the simulator causes the top member 12 of joint 18 to pivot upwardly or counterclockwise as in FIG. 1 about pin 24. This pivotal movement of joint 18 is resisted by viscoelastic mass 36 as it is squeezed between the upwardly moving lower wall 46 of cradle portion 40 and the stationary lower surface 38 of lever 28. However, viscoelastic mass 36 deforms to allow this movement to the required degree such that the simulator tends to tip forwardly and increase the distance between the central portion of the bottom member 12 of joint 18 and the central portion of the uppermost member 12 of the simulator. This increase in length of the simulator is similar to the forward pivoting and straightening of the human neck when a vehicle occupant is subjected to vehicle impact conditions.

After the mass of viscoelastic material 36 has been deformed and the top member 12 of joint 18 pivots upwardly, viscoelastic mass 36 returns to its original configuration and in doing so returns the joint 18 to its original angular position. However, the energy which viscoelastic mass 36 expends in returning this joint to this original position is only a portion of the energy which this mass absorbs during the forward tipping or lengthening of the simulator. This decrease in energy used to return the joint to the original position is also a characteristic of human neck movement during similar impact loading conditions.

The invention thus provides a joint for a human neck simulator which simulates the lengthening and straightening of the neck during impact conditions, and also provides the orientation of the upper portion of the neck that occurs when an occupant is seated in position leaning against the rearwardly tilted seat back of the vehicle seat.

What is claimed is:

1. A joint for use in a human neck simulator which includes a number of vertebra simulating members arranged in a stacked relationship in alignment with each other and connected for multidirectional angular movement cushioned by viscoelastic material to provide the simulator with human-like characteristics when subjected to impact loadings, the joint comprising:

means connecting an adjacent pair of the vertebra simulating members for pivotal movement relative to each other about an axis located forward of the connections between the other members; and viscoelastic material located between this adjacent pair of vertebra simulating members and normally maintaining these members in a predetermined angular position relative to each other so that the simulator is adaptable to position a dummy head on a dummy torso in a predetermined orientation against forward movement therefrom, this viscoelastic material deflecting when the joint is subjected to an impact so as to allow the mentioned pair of adjacent members to pivot relative to each other about their forward axis of connection such that the dummy head moves forward to momentarily increase the length of the simulator before the viscoelastic material returns to its original configuration and moves the simulator back to its original configuration in a lifelike manner.

2. A joint for use in a human neck simulator which includes a number of vertebra simulating members arranged in a stacked relationship in alignment with each other and connected for multidirectional angular movement cushioned by viscoelastic material to provide the simulator with human-like characteristics when subjected to impact loadings, the joint comprising:

means connecting an adjacent pair of the vertebra simulating members at the lower portion of the simulator to connect these members for pivotal movement relative to each other about an axis located forward of the connections between the other members; and viscoelastic material located between this adjacent pair of vertebra simulating members and normally maintaining these members in a predetermined angular position relative to each other so as to define an included angle between 5° and 30° such that the simulator is adaptable to position a dummy head on a seated dummy torso and simulate human forward neck tilting in this seated position while normally resisting further forward tilting of the simulator, this viscoelastic material deflecting when the dummy is subjected to an impact so as to allow the mentioned pair of members to pivot relative to each other about their forward axis of connection such that the dummy head moves forward to momentarily increase the length of the simulator as the viscoelastic material deforms before returning to its original configuration and moving the simulator back to its original configuration in a lifelike manner.

3. A joint for use in a human neck simulator which includes a number of vertebra simulating members arranged in a stacked relationship in alignment with each other and connected for multidirectional angular movement cushioned by viscoelastic material to provide the simulator with human-like characteristics when subjected to impact loadings, the joint comprising:

means pivotally connecting the two lower vertebra simulating members of the neck simulator so as to support these members for movement relative to each other about an axis located forward of the connection between the other members;

first and second viscoelastic receiving portions respectively mounted on the two lower vertebra simulating members rearward of their axis of connection and having respective opposed portions which move toward each other as these two members pivot to increase their included angle and tip the neck simulator forwardly in a manner increasing its length; and a mass of viscoelastic material received between these two opposed portions on the two members and normally maintaining these members so they define an included angle between 5° and 30° such that the simulator is adaptable to position a dummy head on a seated dummy torso and simulate the forward human neck tilting in this seated position while normally resisting further forward tilting of the simulator, this viscoelastic material being squeezed between the two opposed portions of the two members as they pivot about their forward axis of connection such that the head moves forwardly to momentarily tip the simulator forwardly and increase its length as the viscoelastic material deforms before returning to its original configuration and moving the simulator back to its original configuration in a lifelike manner.

* * * * *